April 7, 1953  C. W. HODGES ET AL  2,634,049
ANTI-ICING MEANS FOR THE AIR INTAKE OF GAS TURBINES
Filed Oct. 9, 1947
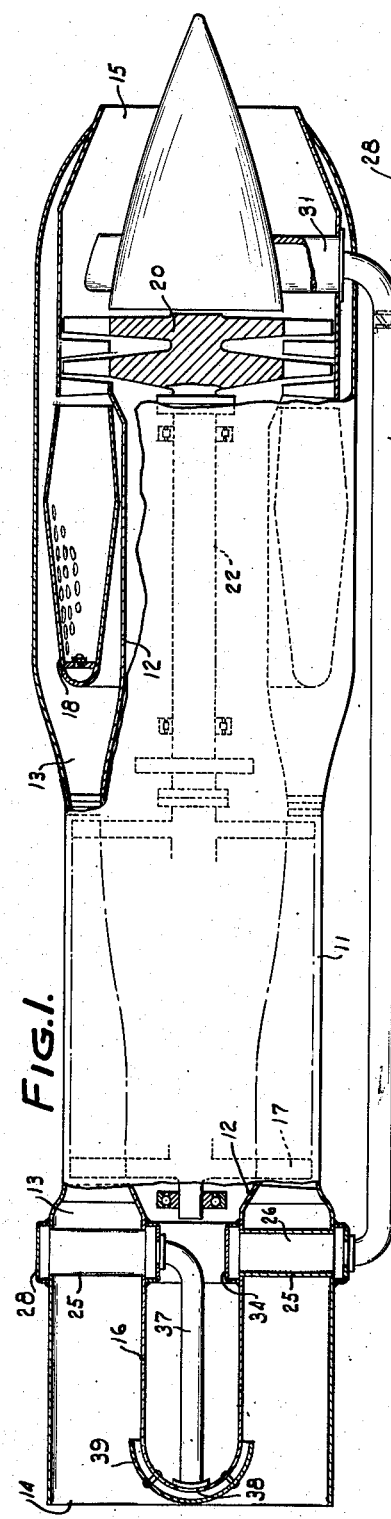
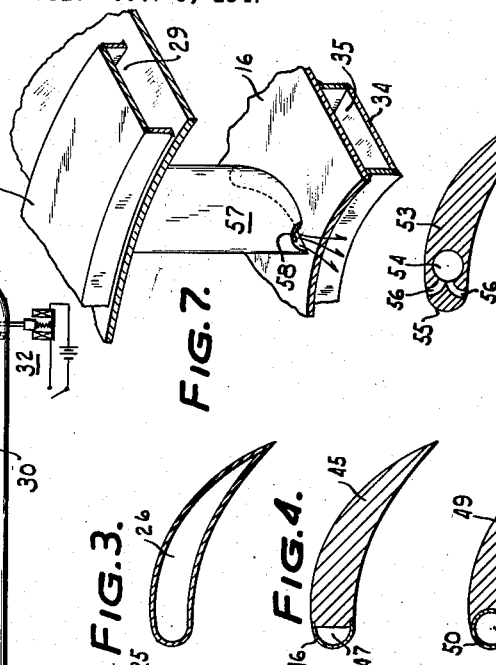
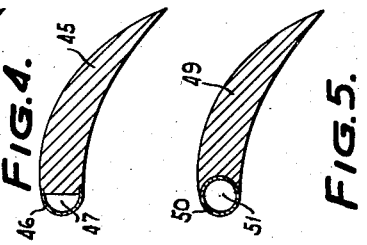
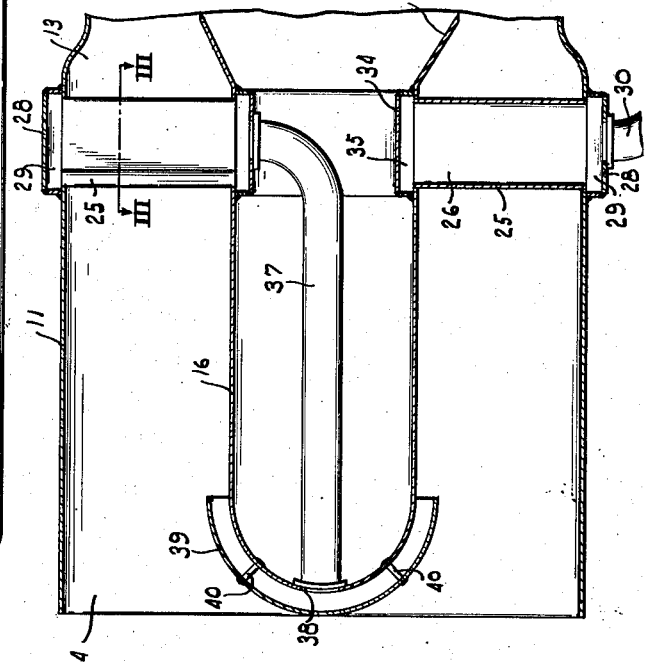
INVENTORS
CHARLES W. HODGES
CARL F. KOENIG III
BY
ATTORNEY Patented Apr. 7, 1953

2,634,049

UNITED STATES PATENT OFFICE 2,634,049

ANTI-ICING MEANS FOR THE AIR INTAKE OF GAS TURBINES

Charles W. Hodges, Swarthmore, and Carl F. Koenig III, Milmont Park, Pa., assignors to Westinghouse Electric Corporation, East Pittsburgh, Pa., a corporation of Pennsylvania Application October 9, 1947, Serial No. 778,830

7 Claims. (Cl. 230—132)

This invention relates to aviation power plants, and more particularly to means for preventing the icing of surfaces in the air intake opening of an aircraft engine.

Various more or less effective means for minimizing the accumulation of ice on exposed intake surfaces of aviation power plants have been proposed. De-icing apparatus is particularly desirable for protection of the air intake opening of a gas turbine engine of the type comprising a turbine-driven axial-flow compressor, which is operable to draw large volumes of air from the atmosphere through the forwardly directed intake opening for delivery under pressure to the fuel combustion apparatus of the engine. Thermal de-icing of nose or spinner housing, struts, duct entrances, and other structural elements or fairings which protrude into the air intake opening passage may be accomplished by the use of a fluid medium, such as oil or gas which is heated during normal operation of the engine.

We propose to employ a simple and practicable de-icing system for an aircraft gas turbine engine arranged for utilization of hot gas piped from a point aft of the compressor, preferably the turbine outlet, to a manifold surrounding the guide vanes or other elements exposed to the air intake passageway of the engine. Certain features of the present invention will, however, readily be found useful in a de-icing system of the type employing a heating fluid other than gas, such as engine lubricating oil.

It is thus an object of our invention to provide improved apparatus for preventing icing of the compressor inlet guide vanes, fairing structure, or other exposed portions of the air intake opening of an aviation power plant.

Another object of the invention is the provision of an improved de-icing apparatus for a gas turbine engine including annular manifolds mounted in the intake opening, and radial guide vanes having passages communicating with the manifolds for effecting circulation therethrough of heating fluid.

Still another object of the invention is the provision of an improved apparatus for preventing icing of surfaces within an air intake passageway, including guide vanes having communications through which heated fluid can be supplied to a vent port located in advance of the usual central fairing section, whereby internal as well as surface heating of exposed elements can be effected.

These and other objects are effected by the invention as will be apparent from the following description and claims taken in connection with the accompanying drawing, forming a part of this application, in which:

Fig. 1 is a longitudinal, elevational view, mainly in section, of an aviation gas turbine power plant having an inlet portion constructed in accordance with the invention;

Fig. 2 is an enlarged detail fragmentary view of the forward end of the apparatus shown in Fig. 1;

Fig. 3 is an enlarged detailed sectional view of one of the guide vanes shown in Fig. 2, taken along the line III—III thereof;

Figs. 4, 5 and 6 are sectional views of different forms of guide vanes which might be substituted for that shown in Fig. 3; and Fig. 7 is a fragmentary sectional view of the inlet portion of a gas turbine engine similar to that shown in Fig. 2, but employing guide vanes having individual vent openings.

Referring now to the drawing in greater detail, the gas turbine engine illustrated in Fig. 1 comprises a streamlined cylindrical outer casing structure 11 which may be mounted in or on the fuselage of an aircraft, and which is adapted to house operating elements arranged in line to present minimum frontal area and drag during operation of the plane at high speed. Supported within the casing structure 11 is an inner casing structure 12 forming an annular passageway 13, which constitutes a flow communication extending longitudinally through the engine from a forwardly directed air intake opening 14 to a rearwardly disposed jet or discharge nozzle 15. Mounted within the casing structure 11—12 along the axis thereof is a hollow fairing section 16, which may contain auxiliary control apparatus (not shown), a multiple stage axial flow compressor 17, fuel combustion apparatus 18, and a turbine 20. The turbine 20 is operatively connected to the rotor of the compressor 17 through the medium of an axially mounted shaft 22 which is suitably journaled within the inner casing structure 12.

In operation, air entering the intake opening 14 is compressed by the compressor 17 and delivered through the passageway 13 to the combustion apparatus 18, to support combustion of fuel therein while, at the same time, protecting adjacent surfaces of the power plant from the resulting high temperatures. Hot motive fluid issuing from the combustion apparatus 18 is then expanded through the turbine 20 and finally discharged through the nozzle 15 in the form of a jet establishing the propulsive thrust. Since the general principles of operation of such a gas turbine power plant are well understood, it is not deemed necessary to describe the functioning of the engine in further detail.

As best shown in Fig. 2 of the drawing, the portion of the outer casing structure 11 which defines the air intake opening 14 substantially surrounds the fairing section 16, which is, in turn, carried as a part of the inner casing structure 12. In order to insure proper distribution of intake air flowing to the compressor, to turn the air to the proper angle so that the air strikes the first rotating elements of the compressor at the proper angle, a plurality of radially disposed stationary guide vanes 25 are interposed between the outer and inner casing structures, the opposite ends of the vanes being preferably welded to the corresponding portions of the respective casing structures. During operation of a gas turbine engine in propelling a plane, large quantities of atmospheric air are necessarily drawn through the intake opening 14 past the fairing section 16 and associated guide vanes 25 and into the annular passageway 13, with the result that deposits of ice tend to accumulate on the exposed surfaces. According to our invention, however, the guide vanes 25 are provided with longitudinal passages for permitting circulation therethrough of heated fluid during operation of the invention, for preventing icing of the exterior surfaces of the vanes.

As shown in Fig. 3, each of the vanes 25 may be made in the form of a hollow airfoil sheath having a passage 26. To provide support for the vanes 25, an annular inlet manifold 28 is mounted on the outer casing structure 11 and welded to the outer ends of the vanes. Formed in the manifold 28 is a passage 29 which communicates by way of a pipe 30 with a gas supply port 31 formed in the wall of the engine rearwardly of the turbine 20, as shown in Fig. 1. If desired, a suitable control valve device 32 may be interposed in the pipe 30 for selective operation to control admission to the pipe of motive fluid at the will of the pilot. Mounted on the inner casing structure 12 concentrically within the manifold 28, and welded to the inner ends of the vanes 25, is an outlet manifold 34 having a passage 35, which communicates through the passages 26 in the respective vanes 25 with the passage 29 in the outer manifold 28. A pipe or conduit 37 is provided within the fairing section 16 for establishing communication from the passage 35 to a port 38 formed in the forward or nose portion of the fairing section, and through which fluid may be vented into the stream of air drawn into the air intake opening 14. A cup-shaped shield 39 is preferably mounted in spaced relation with respect to the forward end of the fairing section 16 for guiding and insuring uniform distribution of fluid issuing from the port 38. The shield 39 may be supported on the fairing section 16 by means of a plurality of studs 40.

From the foregoing, it will be apparent that when the gas turbine engine is operated under conditions tending to induce icing of the fairing section 16 and vanes 25, the control valve device 32 may be operated to supply hot motive fluid exhausted from the turbine 20 through the port 31, pipe 30, and manifold 28 to the respective passages 26 in the guide vanes 25, and thence by way of the inner manifold 34 and pipe 37 to the vent port 38, which is open to the air intake opening 14. Flow of hot motive fluid through the passages in the vanes 25 and pipe 37, aided by discharge flow of hot fluid issuing from the port 38 over the surface of the fairing section 17 and the vanes, will thus be effective to prevent deposition of ice, without in any way impeding the usual supply of atmospheric air through the intake opening 14.

In reducing our invention to practice, other types of guide vanes embodying features of the invention may be substituted for the guide vanes 25 shown in Fig. 2. Referring to Fig. 4, there is illustrated a guide vane 45 having a solid airfoil body portion on which is supported a substantially U-shaped leading wall 46, the rearwardly disposed edges of which are adapted to be welded to the body portion to provide a flow passage 47. It will be understood that the flow passage 47 is adapted to communicate with the respective passages 29 and 35 in the outer and inner manifolds shown in Fig. 2.

As shown in Fig. 5 of the drawing, a solid guide vane 49 may also be substituted for the guide vane 25. The forward end of the guide vane 49 is provided with an arcuate groove into which is welded a tube 50, the passage 51 in which is adapted to communicate with the outer and inner manifolds already described.

Still another form of the invention is shown in Figure 6, in which is illustrated a solid guide vane 53 having a longitudinal bore 54 formed near the leading edge 55 thereof. In addition to communicating with the inner and outer manifolds 34 and 28, as explained in connection with Fig. 2, the bore 54 of the guide vane 53 is adapted to communicate directly with the passageway 13 of the engine by way of a plurality of slots 56 formed in the surface of the vane adjacent the leading edge 55.

Illustrated in Fig. 7 of the drawing is a hollow guide vane 57, which may have the same construction as the vane 25 illustrated in Figs. 1, 2 and 3, but which is in addition provided with a vent opening 58 through which heated fluid can be discharged from the passage within the vane into the annular passageway 13 of the engine.

It will thus be seen that apparatus constructed in accordance with our invention, and embodying guide vanes in any of the forms disclosed, may be utilized to advantage in gas turbine power plants of existing design as well as in engines in the process of development. The improved de-icing apparatus comprises a relatively small number of simply constructed and sturdy elements, which may be incorporated in the structure of the power plant without interference with the functioning of other parts thereof, and without adding to the weight of the equipment.

While the invention has been shown in several forms, it will be obvious to those skilled in the art that it is not so limited, but is susceptible of various changes and modifications without departing from the spirit thereof.

What is claimed is:

1. Casing structure including a cylindrical section and a central fairing section forming an annular air intake opening, concentric annular manifolds mounted in said casing structure, hollow air guide vanes mounted radially within said intake opening and connecting said manifolds, a communication for supplying heated motive fluid to one of said manifolds, and a communication for venting the other of said manifolds into said intake opening at a point near the nose portion of said fairing section, whereby heated motive fluid is supplied through the passages in said manifolds and blades and is discharged over the surface of said fairing section for preventing icing within said air intake opening.

2. Casing structure including a cylindrical section and a central fairing section forming an annular air intake opening, concentric annular manifolds mounted in said casing structure, hollow air guide vanes mounted radially within said intake opening and connecting said manifolds, a communication for supplying heated motive fluid to one of said manifolds, a communication for venting the other of said manifolds into said intake opening at a point near the nose portion of said fairing section, and a cup-shaped shield supported in the front of said nose portion for directing hot motive fluid back over the surfaces of said fairing section and guide vanes.

3. Casing structure including a cylindrical section and a central fairing section forming an annular air intake opening, outer and inner manifolds mounted in said sections, respectively, a communication for supplying heated motive fluid to said outer manifold, another communication for venting said inner manifold into said intake opening in advance of said fairing section, and a plurality of guide vanes mounted radially within said intake opening, each of said vanes having a longitudinal passageway adapted to form a communication between said manifolds.

4. Casing structure including a cylindrical section and a central fairing section forming an annular air intake opening, outer and inner manifolds mounted in said sections, respectively, a communication for supplying heated motive fluid to said outer manifold, another communication for venting the other of said manifolds in advance of said fairing section, and a plurality of guide vanes mounted radially within said intake opening, each of said vanes having a tapered body portion supporting a tubular leading portion forming a longitudinal passageway for connecting said manifolds.

5. Casing structure including a cylindrical section and a central fairing section forming an annular air intake opening, outer and inner manifolds mounted in said sections, respectively, a communication for supplying heated motive fluid to said outer manifold, another communication for venting the other of said manifolds in advance of said fairing section, and a plurality of guide vanes mounted radially within said intake opening, each of said vanes having a tapered airfoil body and a rounded leading wall portion having edges secured thereto to form a longitudinal passageway adapted to connect said manifolds.

6. Casing structure including a cylindrical section and a central fairing section forming an annular air intake opening, outer and inner manifolds mounted in said sections, respectively, a communication for supplying heated motive fluid to said outer manifold, another communication for venting the other of said manifolds in advance of said fairing section, and a plurality of guide vanes mounted radially within said intake opening, each of said vanes having an airfoil body having a longitudinal passageway formed therein for connecting said manifolds, said passageway also communicating with slots formed in said body and opening into said air intake opening.

7. Anti-icing structure comprising an outer cylindrical casing having an open end and a coaxially disposed core therein forming an annular air intake passage, concentric outer and inner annular manifolds supported in said casing adjacent said passage at a substantial distance from the open end of said casing, a plurality of radially disposed guide vanes interposed in said passage between said manifolds, said vanes having internal passages communicating with said outer and inner manifolds, means forming a supply communication for supplying hot motive gases to one of said manifolds, means forming a vent communication for discharging said gases from one of said manifolds at a point remote from said supply communication, said assemblage of manifolds and vanes providing a network of interconnected communications for circulation and exhaust of motive gases conducting heat thereto to prevent icing of surfaces exposed to said passage.

CHARLES W. HODGES.
CARL F. KOENIG III.

REFERENCES CITED

The following references are of record in the file of this patent:

UNITED STATES PATENTS

| Number | Name | Date |
|---|---|---|
| 1,848,555 | Wilford | Mar. 8, 1932 |
| 2,404,275 | Clark et al. | July 16, 1946 |
| 2,435,990 | Weiler | Feb. 17, 1948 |